3,250,840
PROCESS FOR CURING MILLABLE
POLYURETHANE GUM
Oreste Procopio, Bristol, R.I., assignor to Rohm & Haas
Company, Philadelphia, Pa., a corporation of Delaware
No Drawing. Filed Nov. 2, 1962, Ser. No. 235,153
3 Claims. (Cl. 264—175)

This invention relates to the curing of millable polyurethane gums and, more particularly, to the curing of millable polyurethane gums using organic peroxide curing agents.

By the term "millable polyurethane gum" is meant a polyurethane resin having a Mooney viscosity such that it can be processed in conventional rubber machinery as on a rubber mill, a Banbury mixer or extruded without undue scorching or other adverse effect. A number of such products are commercially available under this description, including, inter alia, those available under the trade names Genthane, Vibrathane, Estane and Texin. Generally these products have either no free isocyanate groups or virtually no free isocyanate groups and generally, though not necessarily, will possess some free hydroxyl groups. The preparation of such resins is described, for example, in U.S. 2,431,921 to Cook et al., in U.S. 2,777,831 to Seeger et al. and in U.S. 2,953,539 to Keplinger et al. Most millable polyurethane gums commercially available are derived by condensing an aromatic diisocyanate in almost equimolar amount with a polyester or polyesteramide having terminal hydroxyl groups. Equally desirable products may be made by utilizing other reactants. Thus, aliphatic and/or alicyclic diisocyanates may be used, while the other reactant may be polyether or similar low molecular weight polymer. The resulting products have a generally linear polymer structure and are cured by various techniques as, for example, with an excess of additional polyisocyanate or other reactant. Conventionally, however, such products are cured using sulfur, an organic peroxide, etc. To assist such curing the millable polyurethane gum may include a small amount of unsaturation, generally by including some unsaturated acid in the preparation of the prepolymer. The resulting cured products have properties ranging from elastomeric rubber-like materials to more resinous, even leather-like materials. The resulting cured products are used, inter alia, in conveyor and drive belts, shoe soles and heels, diaphragms, gaskets, roll covers, threads, hose, tank lining and other mechanical and industrial goods. In most such uses one or more additional ingredients as fillers, pigments, dyes, plasticizers, anti-ozonants, ultra-violet absorbers, etc., are incorporated in the composition.

In the normal process for producing such products, the millable gum, peroxide curing agent and other ingredients as described are blended on conventional rubber processing equipment as a Banbury mixer or rubber mill, the mixture placed in a mold, subjected to suitable pressure and cured at an elevated temperature for a suitable time, generally upwards of half an hour. The mold necessarily excludes the atmosphere from contact with the gum during the curing. This process is necessarily a batch operation and highly time-consuming with the result that high manufacturing and handling costs further add to the cost of the material. Although hot air curing has been generically disclosed as by Cook et al. in U.S. 2,431,921, heretofore it has been regarded as impractical and as leading to inferior products.

Accordingly, it is an object of the invention to provide an improved process for curing millable polyurethane gums.

It is a further object of the invention to provide a cured polyurethane gum having improved physical properties.

Another object of the invention is to provide a process for curing millable polyurethane gum adapted for semicontinuous operation.

These and other objects of the invention will become apparent in the following description.

In accordance with the present invention, it has been found that improved cured polyurethane gums may be produced on a semi-continuous basis by sheeting the gum containing the peroxide curing agent and, optionally, other compounding ingredients, into a sheet no more than about 10 mils thick and curing the sheet at elevated temperature for a period of about 1 minute under oxidizing conditions, i.e., in contact with atmospheric oxygen, on all sides of the sheet. This combination of time, temperature and free access of air to all sides of the sheet has been found to give a cured product having improved physical properties as well as offering a process which is easily and economically adapted to commercial operation. In general, it has been found that the amount of peroxide curing agent will vary from about 4 to about 12% of peroxide based on the total weight of the sheet in the case of dicumyl peroxide. This amount is not critical and smaller or greater amounts may be used, depending on the properties desired in the cured product. Other peroxides may be used in similar manner. The amount of peroxide will also vary from peroxide to peroxide due, among other factors, to differences in half-life of the materials. In general, the temperature for curing will be from about 375 to about 520° F. It is important to cure the gum in the presence of atmospheric oxygen. Free access of air to all sides of the sheet is obtained by using a screen or air cushion to support the sheet through the curing zone. Under these conditions it has been found that curing is complete in about 1 minute, although the exact time may vary somewhat from this figure. Any organic peroxide normally used in curing millable polyurethane gums may be used. Among those found particularly useful in the instant invention are dicumyl peroxide, ditertiary-butyl peroxide, tertiary-butyl perbenzoate, benzoyl peroxide and 2,5-dimethyl-2,5-di-(t-butylperoxy)hexyne-3. Dicumyl peroxide is particularly preferred.

The peroxide is incorporated in the millable polyurethane gum in a rubber mill, Banbury or other mixing equipment. Other conventional compounding ingredients may also be incorporated at the same time in similar manner. Such ingredients include pigments, such as titanium dioxide, antimony oxide, silica, zinc oxide, carbon black, etc., anti-oxidants such as hydroquinone, N-phenol-beta-naphthylamine, etc., plasticizers, detackifiers, fillers, etc. The millable polyurethane gum may also be blended with other plastic materials such as synthetic rubbers, etc.

Certain of these compounding ingredients affect the ability of certain peroxides in effecting a cure. Thus, for example, dicumyl peroxide is generally not effective in the presence of acidic carbon black. However, other peroxides as for example 2,5-dimethyl - 2,5 - di-(t-butylperoxy)hexyne-3 are effective in the presence of such blacks. The effect of these compounding ingredients on such peroxide material is known to these skilled in the art and does not constitute part of the instant invention.

After incorporating the various compounding ingredients as described, the material is then sheeted out as on a calender or similar device in a sheet no more than about 10 mils thick. The sheet, supported on a screen or air cushion, is then led through an oven where it is heated to a temperature of from about 375 to about 520° F. during its transit therethrough, the speed of movement of the sheet and the length of the oven being adjusted so that the residence time of the sheet within the oven will be about 1 minute. This time has been found adequate for cure using the proper temperature and concentration of peroxide. The process time and temperature, of course, will vary as the nature of the peroxide, etc., are also varied.

As can be seen, the process as described is admirably adapted for semi-continuous operation, i.e., the compounding ingredients are mixed with the millable gum on a batch basis, while the sheeting and curing are carried out on a continuous basis. Depending on the nature of the ingredients incorporated with the millable gum, the compounded blend may be stored for significant periods prior to sheeting and curing if desired. Where the ingredients incorporated are such that reaction occurs even at room temperature, this is not possible. Thus, where a diisocyanate dimer is incorporated with the stock to assist in curing, the sheeting and curing should start within about 30 minutes after incorporation of the dimer because of the reactivity of this material even at room temperatures. These and similar variations will be obvious to those skilled in the art.

The following example, in which parts are by weight, is illustrative of the invention.

*Example*

To 100 parts of a millable polyurethane gum obtained under the trade name Genthane from General Tire & Rubber Co., and believed to be a hydroxyl-terminated linear polyurethane prepared from methylene bis(4-phenylisocyanate) and the adipic polyester of a mixture of 80 mol percent ethylene glycol and 20 mol percent 1,4-butylene glycol, there were added on a 2-roll rubber mill 12 parts of titanium dioxide, 6 parts of tolylene diisocyanate dimer, 8 parts of dicumyl peroxide, 30 parts silica (Cabosil M7), 1.5 parts of tricresyl phosphate and 0.18 part ultramarine blue. The materials were milled at a temperature of 210–230° F. until the ingredients were thoroughly mixed. The resulting mixture was then sheeted out from a calender in a film of about 10 mils thick. The resulting sheet was cut in half and one half (termed the "control") subjected to the conventional curing process wherein it was placed in a mold under suitable hydraulic pressure and maintained at a temperature of 310° F. for 45 minutes. The other half (termed "open-air cured") while supported on a stainless steel screen was heated in the open air at 475° F. for about 1 minute. The properties of the products resulting from these two treatments are set forth in the following table:

|  | 300% Modulus | Elongation (percent) | Tensile Strength, p.s.i. | Break Set (percent) |
|---|---|---|---|---|
| Control | 800 | 600 | 5,000 | 15 |
| Open-air cured | 3,000 | 550 | 6,000 | 4 |

The great increase in modulus is particularly noteworthy in that it was obtained without significant loss in elongation. In addition, the tensile strength was appreciably increased and the break set markedly decreased.

On rerunning the material, substituting ditertiary-butyl peroxide, tertiary-butyl perbenzoate, benzoyl peroxide and 2,5-dimethyl-2,5-di(t-butylperoxy)hexyne-3, for the dicumyl peroxide in the above formulation, similar improvement was obtained on curing the resulting film at a higher temperature in the open air as compared to the conventional curing process in a mold.

The process was also repeated, substituting a millable gum obtained from U.S. Rubber under the tradename Vibrathane and a millable gum obtained from B. F. Goodrich and Co. under the tradename Estane for the Genthane in the formulation of the example. In each case similar improved results were obtained to those set forth above.

What is claimed is:

1. A process for the peroxide curing of a millable polyurethane gum, said process comprising forming a uniform mixture of a millable polyurethane gum and an organic peroxide selected from the group consisting of dicumyl peroxide, t-butyl perbenzoate, di-t-butyl peroxide and 2,5-dimethyl-2,5-di(t-butyl peroxy)hexyne-3, sheeting out said mixture in a film no more than about 10 mils thick and heating said mixture to between 375° F. and about 520° F. for about one minute in the presence of atmospheric oxygen in direct contact with all sides of said film.

2. A process according to claim 1 wherein said peroxide comprises from about 4 to about 12% by weight of the composition.

3. A process according to claim 1 wherein the peroxide is dicumyl peroxide.

References Cited by the Examiner

UNITED STATES PATENTS

| 2,431,921 | 12/1947 | Cook et al. | 260—75 |
| 2,995,531 | 8/1961 | Hudson | 260—75 |
| 2,999,851 | 9/1961 | Elmer | 260—75 |
| 3,031,422 | 4/1962 | Posnansky | 260—75 |
| 3,036,042 | 5/1962 | Schmidt et al. | 260—75 |
| 3,061,885 | 11/1962 | Rogers et al. | 260—2.5 |
| 3,154,611 | 10/1964 | Dinsbergs | 264—176 |

FOREIGN PATENTS

| 802,153 | 10/1958 | Great Britain. |
| 820,004 | 9/1959 | Great Britain. |
| 822,532 | 10/1959 | Great Britain. |

ALEXANDER H. BRODMERKEL, *Primary Examiner.*

K. W. VERNON, A. L. LEAVITT, *Assistant Examiners.*